(12) United States Patent
Andreasen et al.

(10) Patent No.: US 8,385,300 B2
(45) Date of Patent: Feb. 26, 2013

(54) INTERNET PROTOCOL ADDRESS MANAGEMENT FOR COMMUNICATING PACKETS IN A NETWORK ENVIRONMENT

(75) Inventors: Flemming S. Andreasen, Marlboro, NJ (US); Kent K. Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 866 days.

(21) Appl. No.: 12/245,601

(22) Filed: Oct. 3, 2008

(65) Prior Publication Data
US 2010/0088400 A1 Apr. 8, 2010

(51) Int. Cl.
*H04W 4/00* (2009.01)
*H04W 40/00* (2009.01)
*H04W 72/00* (2009.01)
*H04L 12/66* (2006.01)
*G06F 15/16* (2006.01)
*G06F 15/173* (2006.01)

(52) U.S. Cl. ... 370/338; 370/349; 370/352; 370/395.52; 370/401; 455/435.1; 455/445; 455/453; 709/223; 709/245

(58) Field of Classification Search ............... 370/338, 370/349, 352, 395.52, 401; 455/435.1, 445, 455/453; 709/223, 245
See application file for complete search history.

(56) References Cited

U.S. PATENT DOCUMENTS

| | | | |
|---|---|---|---|
| 6,374,108 B1 * | 4/2002 | Jakobsen et al. | 455/432.1 |
| 6,487,605 B1 * | 11/2002 | Leung | 709/245 |
| 6,501,746 B1 * | 12/2002 | Leung | 370/338 |
| 6,515,974 B1 * | 2/2003 | Inoue et al. | 370/331 |
| 6,587,882 B1 * | 7/2003 | Inoue et al. | 709/227 |
| 6,769,000 B1 | 7/2004 | Akhtar et al. | |
| 6,842,456 B1 * | 1/2005 | Chen et al. | 370/401 |
| 6,937,590 B2 * | 8/2005 | Lee | 370/338 |
| 7,039,404 B2 * | 5/2006 | Das et al. | 455/435.1 |
| 7,079,499 B1 | 7/2006 | Akhtar et al. | |
| 7,079,520 B2 * | 7/2006 | Feige et al. | 370/338 |
| 7,158,492 B2 * | 1/2007 | Haverinen | 370/328 |
| 7,191,226 B2 * | 3/2007 | Flykt et al. | 709/218 |
| 7,230,951 B2 * | 6/2007 | Mizell et al. | 370/401 |
| 7,242,932 B2 | 7/2007 | Wheeler et al. | |
| 7,277,416 B1 | 10/2007 | Chang et al. | |
| 7,379,433 B1 * | 5/2008 | Patel et al. | 370/312 |
| 7,562,393 B2 * | 7/2009 | Buddhikot et al. | 726/26 |
| 7,616,597 B2 * | 11/2009 | Liu et al. | 370/328 |
| 7,764,640 B2 * | 7/2010 | Lee et al. | 370/328 |
| 7,912,035 B1 * | 3/2011 | Leung et al. | 370/351 |
| 7,929,966 B2 | 4/2011 | Iyer et al. | |
| 2003/0021275 A1 * | 1/2003 | Shabeer | 370/393 |
| 2003/0023737 A1 | 1/2003 | Johnson et al. | |
| 2003/0208568 A1 * | 11/2003 | Inoue et al. | 709/220 |

(Continued)

*Primary Examiner* — Alpus H Hsu
(74) *Attorney, Agent, or Firm* — Patent Capital Group

(57) ABSTRACT

A method is provided in one example implementation and the method includes identifying through a home bearer manager that an Internet Protocol (IP) address has been previously sent to an access terminal, the IP address being issued by a visited bearer manager as a result of the access terminal requesting registration in a visited network. The method further includes communicating the IP address to the access terminal in response to the access terminal registering in a home network. The registrations in the home and the visited network allow a plurality of packets to be communicated to the access terminal via the IP address. In more specific embodiments, the IP address serves as a care of address (CoA) address and a home IP address concurrently. The IP address can be exchanged via a mobile IP (MIP) exchange. The home and visited bearer managers are independent or interdependent.

21 Claims, 4 Drawing Sheets

U.S. PATENT DOCUMENTS

| | | |
|---|---|---|
| 2004/0013116 A1 | 1/2004 | Greis et al. |
| 2004/0153525 A1 | 8/2004 | Borella |
| 2004/0162892 A1* | 8/2004 | Hsu ................................ 709/221 |
| 2005/0102421 A1* | 5/2005 | Horvath et al. ............... 709/238 |
| 2005/0188093 A1* | 8/2005 | Haddad ......................... 709/228 |
| 2005/0265278 A1* | 12/2005 | Hsu et al. ...................... 370/328 |
| 2006/0077932 A1* | 4/2006 | Takeda et al. ................. 370/331 |
| 2006/0140177 A1* | 6/2006 | Karhu ........................... 370/356 |
| 2006/0209778 A1* | 9/2006 | Feige et al. .................... 370/338 |
| 2007/0208864 A1* | 9/2007 | Flynn et al. ................... 709/227 |
| 2007/0274262 A1* | 11/2007 | Hung et al. ................... 370/331 |
| 2008/0025325 A1* | 1/2008 | Strater ........................... 370/401 |
| 2008/0089251 A1* | 4/2008 | Gallego et al. ................ 370/277 |
| 2008/0198810 A1* | 8/2008 | Patel et al. .................... 370/331 |
| 2009/0092095 A1* | 4/2009 | Hata et al. ..................... 370/331 |
| 2010/0268583 A1* | 10/2010 | Backman ....................... 705/14.4 |

* cited by examiner

INTERNET PROTOCOL ADDRESS MANAGEMENT FOR COMMUNICATING PACKETS IN A NETWORK ENVIRONMENT

TECHNICAL FIELD OF THE INVENTION

This invention relates generally to the field of communications and, more specifically, to internet protocol address management for communicating packets in a network environment.

BACKGROUND OF THE INVENTION

An endpoint, such as an access terminal, may use a system of communication networks to communicate packets to other endpoints. For example, an access terminal may subscribe to a home network that maintains subscription information for the access terminal. If the access terminal is outside of the serving area of the home network, the access terminal may use a visited network to communicate packets.

Certain known techniques may be used to route packets between endpoints and through networks. These known techniques, however, are not efficient in certain situations. The ability to minimize these problems or to optimize these communications presents a significant challenge to service providers, network administrators, component manufacturers, and system designers alike.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Overview

A method is provided in one example implementation and the method includes identifying through a home bearer manager that an Internet Protocol (IP) address has been previously sent to an access terminal, the IP address being issued by a visited bearer manager as a result of the access terminal requesting registration in a visited network. The method further includes communicating the IP address to the access terminal in response to the access terminal registering in a home network. The registrations in the home and the visited network allow a plurality of packets to be communicated to the access terminal via the IP address. In more specific embodiments, the IP address serves as a care of address (CoA) address and a home IP address concurrently. The IP address can be exchanged via a mobile IP (MIP) exchange. The home and visited bearer managers are independent or interdependent. In still other embodiments, once the IP address is sent to the access terminal, the home bearer manager operates as both the visited bearer manager and the home bearer manager for the access terminal.

Figure 1:
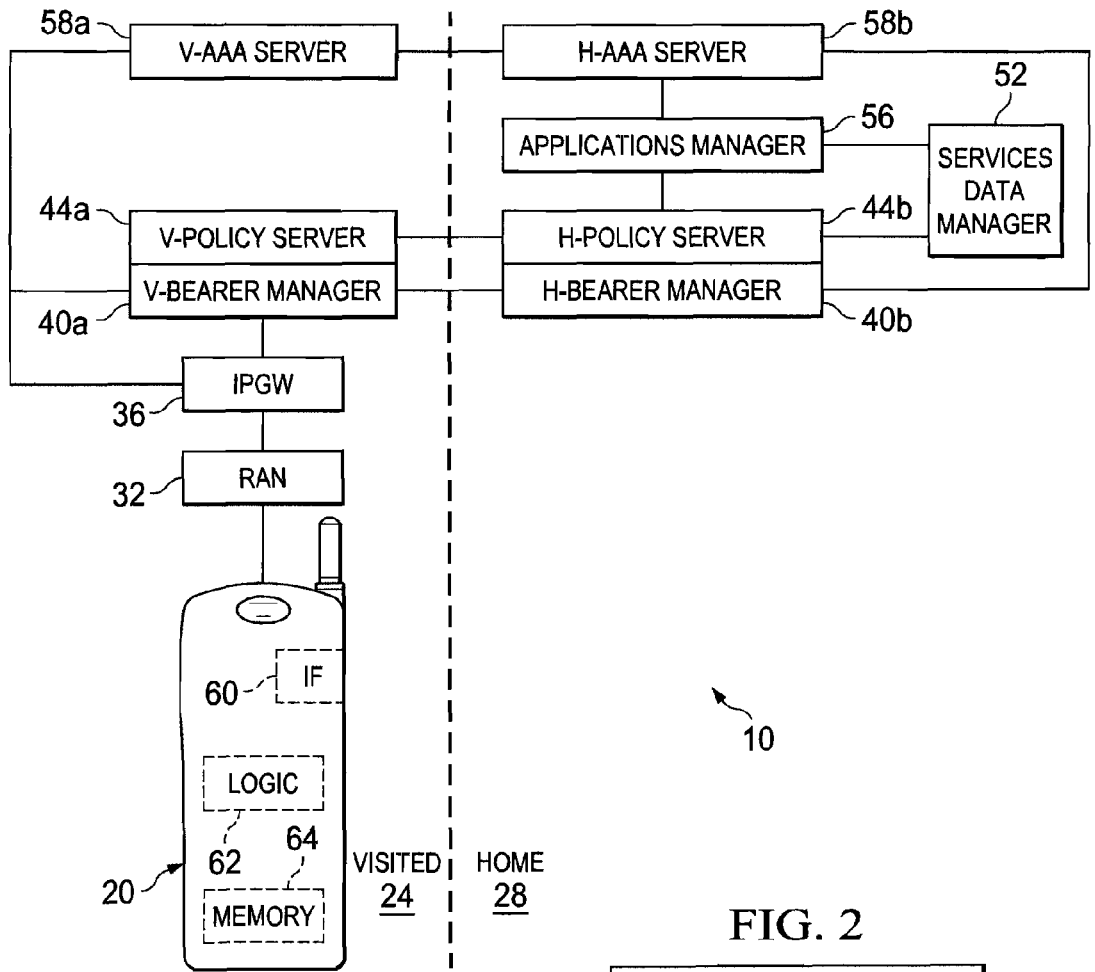
FIG. 1 illustrates one example embodiment of a communication system that communicates packets for an access terminal.

FIG. 1 illustrates one embodiment of a communication system 10 that communicates packets for an access terminal 20. Packets from access terminal 20 can be communicated along a home anchored path or a visited anchored path. The home anchored path can include a home bearer manager 40b of a home network 28 of access terminal 20 and a visited bearer manager 40a of a visited network 24. The visited anchored path can include visited bearer manager 40a, but not necessarily home bearer manager 40b. Access terminal 20 can be provided with a home network address (H-NA) and a visited network address (V-NA). The home network address may be used to communicate packets along the home anchored path, and the visited network address may be used to communicate packets along the visited anchored path.

In accordance with teachings of the present invention, communication system 10 can provide a combined visited and home Internet Protocol (IP) mobility anchor feature that readily supports dual-anchoring protocols. The anchor can recognize when it is used as both the visited and the home network anchor for a particular access terminal and, in that case, assign only a single IP address to the access terminal. This may be significant as most access terminals will reside in their home network/region most of the time.

Such an implementation could provide a significant reduction in the amount of IP addresses needed to support dual-anchoring. The home anchor can recognize that it is also the visited network anchor by simply looking at the care of address (CoA) address (or source IP address in the case of network address translations (NATs)). Thus, example embodiments of the present invention can provide a reduction in the number of (already scarce) IPv4 addresses (or other types of addresses) needed to support dual-anchoring. Additionally, such an architecture requires minimal (if any) changes on the access terminal and, further, no application specific changes to be supported (assuming dual-anchoring support is already in place). Moreover, such a strategy can provide a solution that leaves the service provider in control of when and how to ensure that the optimization is being used.

In operation, communication system 10 can provide services such as communication sessions to endpoints such as access terminal 20. A communication session refers to any communication between endpoints. Information may be communicated during a communication session. Information may refer to voice, data, text, audio, video, multimedia, control, signaling, unicast, multicast, or any combination of any of the preceding. Information may be communicated in packets. A packet may comprise a bundle of data organized in a specific way for transmission.

According to the illustrated embodiment, communication system 10 can include access terminals 20. Access terminal 20 represents any suitable device (or endpoint) operable to communicate with a communication network. Access terminal 20 may comprise, for example, a personal digital assistant, a computer (such as a laptop or a desktop), a cellular telephone, a mobile handset, or any other device operable to communicate with communication system 10. Access terminal 20 may support any suitable protocol, for example, simple IP and/or mobile IP.

Communication system 10 can also include communication networks such as a visited network 24 and a home network 28. In general, a communication network may comprise at least a portion of a public switched telephone network (PSTN), a public or private data network, a local area network (LAN), a metropolitan area network (MAN), a wide area network (WAN), a wireless LAN (WLAN), a local, regional, or global communication or computer network such as the Internet, a wireline or wireless network, an enterprise intranet, other suitable communication links, or any combination of the preceding.

In the illustrated embodiment, visited network 24 represents a communication network that facilitates a communication session for access terminal 20 within the serving area of visited network 24. Home network 28 represents a communication network that can maintain a subscription for access terminal 20. In other instances, the subscription may include an account that is charged based upon usage by access terminal 20. Visited network 24 and home network 28 may be part of the same or different communication networks.

Visited network 24 and home network 28 may include any suitable components for facilitating a communication session for access terminal 20. According to the illustrated embodiment, visited network 24 can include a radio access network (RAN) 32, an IP gateway 36, a visited bearer manager (V-BM) 40a, a visited policy server (V-PS) 44a, a visited authentication, authorization, and accounting (AAA) server (V-AAA) 58a. Home network 28 can include a home bearer manager (H-BM) 40b, a home policy server (H-PS) 44b, a services data manager (SDM) 52, an applications manager (AM) 56, and a home AAA server (H-AAA) 58b.

Radio access network 32 can provide access services to access terminal 20. For example, radio access network 32 may provide layer-two mobile access, mobility, and/or handoff services within its area of coverage. IP gateway 36 operates as a gateway between radio access network 32 and an IP network. IP gateway 36 may perform operations such as authenticating access terminal 20, assigning a bearer manager 40 to access terminal 20, performing handoff functions between two IP gateways 36 or IP gateway 36 and radio access network 32, and/or facilitating the registration of access terminal 20 to the IP network. In one embodiment, IP gateway 36 may comprise a packet data serving node (PDSN).

Bearer managers 40 can allocate resources and provide bearer paths that communicate packets to and/or from access terminal 20. According to one embodiment, either bearer manager 40 operates as an anchor for a bearer path for access terminal 20. Similarly, either bearer manager 40 may also operate as a home or foreign agent that authorizes use of a network address that allows access terminal 20 to use the bearer path anchored by bearer manager 40.

In the illustrated embodiment, visited bearer manager 40a of visited network 24 can provide services to access terminal 20 in visited network 24. According to one embodiment, a visited bearer manager 40a operates as an anchor for a visited anchored path. In the embodiment, visited bearer manager 40a can provide a visited network address that allows access terminal 20 to use the visited anchored path. An example of a visited network address can include a visited IP (V-IP) address.

In the illustrated embodiment, home bearer manager 40b of home network 28 can provide services to access terminal 20. According to one embodiment, home bearer manager 40b operates as an anchor for a home anchored path. In the embodiment, home bearer manager 40b can provide a home network address that allows access terminal 20 to use the home anchored path. An example of a home network address can include a home IP (H-IP) address. The visited home anchored paths are described in more detail with reference to FIG. 2.

Figure 2:
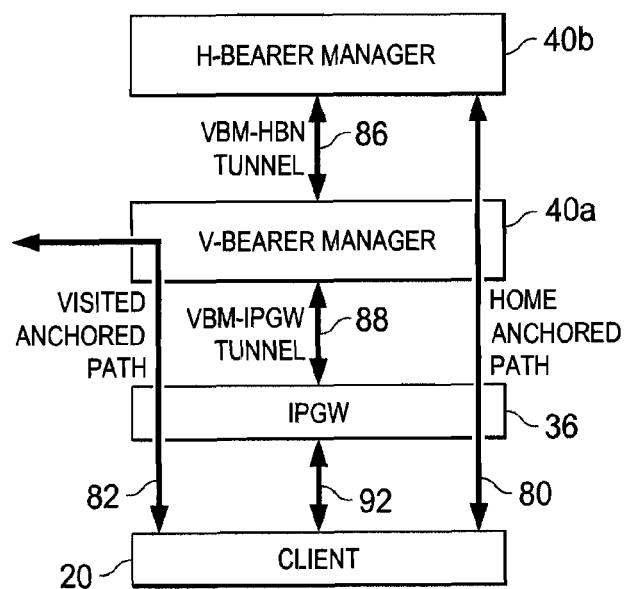
FIG. 2 illustrates examples of bearer paths of the system of FIG. 1.

FIG. 2 illustrates examples of bearer paths of communication system 10 of FIG. 1. The bearer paths include a home anchored path 80 and a visited anchored path 82. Home anchored path 80 is anchored at home bearer manager 40b and passes through visited bearer manager 40a. Home anchored path 80 may allow visited bearer manager 40a to perform operations for packets on path 80, for example, enforce packet policies, account for the packets, and/or perform other operations. The home network address allows access terminal 20 to use home anchored path 80. Packets that have the visited network address as a care of address (CoA) for the home network address may be routed along path 80.

Visited anchored path 82 is anchored at visited bearer manager 40a and does not necessarily pass through home bearer manager 40b. Accordingly, visited anchored path 82 may have a latency that is lower than home anchored path 80. The visited network address allows access terminal 20 to use visited anchored path 82.

Paths 82 and 80 may be utilized in any suitable manner. For example, visited anchored path 82 may be used for situations with stricter latency requirements, but home anchored path 80 may be used for situations that require a more stable path. Home anchored path 80 also enables home network 28 to provide home network specific functions and services that are not supported by visited network 24. In certain cases, both paths 82 and 80 may be used. For example, home anchored path 80 may be used for signaling, and visited anchored path 82 may be used for media. In one embodiment, home anchored path 80 may be the default path.

HBM-VBM tunnel 86 represents a bi-directional tunnel between home bearer manager 40b and visited bearer manager 40a. VBM-IPGW tunnel 88 represents a bidirectional tunnel between visited bearer manager 40a and IP gateway 36. VBM-IPGW tunnel 88 may allow visited bearer manager 40a to forward traffic to access terminal 20 via IP gateway 36, and may comprise, for example, a proxy mobile IP (PMIP) tunnel. Link 92 represents a communication link between IP gateway 36 and access terminal 20. Link 92 may comprise, for example, a point-to-point (PPP), A.10 or A.11 link.

Referring back to FIG. 1, network addresses may be communicated to access terminal 20 in any suitable manner. As an example, a network address may be communicated using the Dynamic Host Configuration Protocol (DHCP). As another example, network address may be communicated using the Point-to-Point Protocol (PPP).

Bearer managers 40 may perform other suitable operations to provide services to access terminal 20. Examples of other suitable operations include processing signaling, committing resources, and maintaining gateways for access terminal 20. Other examples include enforcing network policies (such as mobility policies), providing security, detecting application layer traffic, recording network presence, and/or performing other suitable operation.

A bearer manager 40 may comprise any suitable device that executes the operations as outlined herein. It should also be noted that as used herein in this Specification, the terms 'home bearer manager' and 'visited bearer manager' connote any type of server, router, bridge, gateway, processor, switch, or equivalent electronic network appliance or device that is capable of performing some type of address processing. In more specific example, bearer manager 40 is a Serving General Packet Radio Services (GPRS) Support Node (SGSN), it is a GPRS Gateway Support Node (GGSN), it is a home/foreign agent, it is a mobile gateway, it is a mobile IPv6 node, or it is a Packet Data Serving Node (PDSN).

Policy servers 44 manage policy rules and provide the policy rules to bearer managers 40. In the illustrated embodiment, policy server 44*a* can provide policy rules to bearer manager 40*a*. Policy server 44*b* can provide policy rules to bearer manager 40*b*, and may also provide policy rules to policy server 44*a*.

In one embodiment, a policy may include rules that specify an action to be taken in particular situations. Policies may include routing rules and other suitable rules such as charging, quality of service, usage tracking, and/or other rules. A routing rule may specify how to route a packet. For example, a routing rule may specify situations in which visited anchored path 82 or home anchored path 80 is to be used. For example, a rule may specify that if packet has a particular source and/or destination, then the packet to be routed along visited anchored path 82. Otherwise, the packet is to be routed along home anchored path 80. In one embodiment, a routing rule that allows the visited network address may be installed for a specific duration, and then revoked.

According to one embodiment, a routing rule may specify that home anchored path 80 is used for certain applications and visited anchored path 82 is used for other (potentially different) applications. For example, home anchored path 80 is used for signaling (such as session initiation protocol (SIP) signaling) and visited anchored path 82 is used for media (such as voice over IP (VoIP)).

Any suitable routing rule may be used. As an example, a routing rule may specify that if access terminals 20 engaged in a real-time communication session are being serviced by the same visited network 24, then use visited anchored path 82. As another example, a routing rule may specify that if there is not an appropriate relationship between visited network 24 and home network 28, then use home anchored path 80. As another example, a routing rule may specify that if high security that can only be provided by home network 28 is required, then use home anchored path 80.

In one embodiment, routing rules may be used to provide instructions to access terminal 20 for using home anchored path 80 or visited anchored path 82. The instructions may be provided in any suitable manner. For example, the routing rule may be forwarded to access terminal 20. Access terminal 20 may receive a URL to download the routing rules. As another example, access terminal 20 may be configured with the routing rule. As another example, visited bearer manager 40*a* may obtain the routing rule and may instruct access terminal 20 in accordance with the routing rule.

Services data manager (SDM) 52 stores subscriber data for access terminals 20. According to one embodiment, services data manager 52 may store policy documents that define policies. One or more subscribers may be associated with a particular policy document that defines the policies for those subscribers.

Application manager 56 manages applications, such as SIP applications and/or other suitable applications. The applications may be used to perform SIP operations (such as SIP registration, authorization, and routing), voice features (such as call routing and call forwarding), services (such as push-to-talk (PTT) and IP Centrex), Service Capabilities Interaction Management (SCIM), user presence services, and/or other operations. A non-SIP application manager may be used to perform non-SIP operations, such as real-time streaming media using Real Time Streaming Protocol (RTSP), gaming applications using proprietary protocols, and/or other operations. Application manager 56 may communicate with policy server 44 to request a policy to be implemented on its behalf for a particular access terminal 20.

AAA servers 58 perform authentication, authorization, and/or accounting operations. In one example, home AAA server 58*b* performs these operations for access terminal 20. Visited AAA server 58*a* requests that home AAA server 58*b* performs these operations for access terminal 20 served by visited network 24.

Any component of communication system 10 may include any suitable arrangement of elements, for example, an interface, logic, memory, other suitable element, or combination of any of the preceding. For example, access terminal 20 can include an interface 60, logic 62, and a memory 64. An interface receives input, sends output, processes the input and/or output, performs other suitable operations, or performs a combination of any of the preceding. An interface may comprise hardware and/or software.

Logic can perform the operations of the component, for example, executing instructions to generate output from input. Logic may include hardware, software, other logic, or combinations of any of the preceding. Certain logic, such as a processor, may manage the operation of a component. Examples of a processor include one or more computers, one or more microprocessors, one or more applications, other logic, or a combination of any of the preceding.

A memory of these components can store information. Such memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Before turning to additional operational aspects of embodiments of the present invention, some preliminary information about typical dual-anchoring protocols is provided. The following foundational information may be viewed as a basis from which the present invention may be properly explained. Such information is offered earnestly for purposes of explanation only and, accordingly, should not be construed in any way to limit the broad scope of the present invention and its potential applications.

In a dual-anchoring scenario, an access terminal is assigned two different IP addresses on an anchor point (e.g., a bearer manager) located in two different places. The local anchor point (e.g., a visited bearer manager) is located in the visited network or region, where it can provide local breakout for IP traffic. Use of the local anchor point can be useful for delay-sensitive traffic, which typically does not need provider-specific treatment (e.g. deep packet inspection, special charging rules, etc). An example of such traffic is RTP/RTCP for a VoIP call. The home anchor point (e.g., a home bearer manager) is located in the access terminal's home network or region and can provide a stable IP address for the access terminal. The home anchor point is generally used for delay-tolerant traffic and/or traffic that may need special home network treatment (e.g., DPI or charging). Both the local and visited IP anchor will support IP mobility. The home anchor point remains the same once assigned, whereas the visited anchor point may change due to mobility events.

Dual-anchoring requires that the access terminal is provided with (at least) two different IP addresses; one on the visited anchor (visited anchor address) and one on the home anchor (home anchor address). This is twice the number of IP addresses required for normal IP service (whether mobile IP-based or not). While this may not be a problem when using some protocols (e.g., IPv6), it can be a significant problem when using others (e.g., IPv4) because some publicly available addresses are limited and many are being quickly consumed.

The architecture of communication system 10 offers a mechanism that reduces the number of addresses required when using dual-anchoring. Turning to an example that is illustrative of this concept, typically, the access terminal will be in its home network or home region and, hence, the visited anchor point and the home anchor point can be the same (e.g., H-BM=V-BM). When the visited and home anchor points are the same, the IP Multimedia Subsystem (IMS) or Advanced IMS (A-IMS) architectures require the access terminal to be assigned two different IP addresses (visited anchor and home anchor).

Examples of the present invention can still assign a visited anchor and a home anchor address to the access terminal; however, the address assigned could be the same (visited anchor=home anchor) thereby reducing the number of IP addresses needed from the service provider. This can provide a general solution for the dual-anchoring capable access terminal that does not alter any existing procedures or otherwise require special treatment for the optimized case. The access terminal only needs to be able to deal with the fact that the visited anchor and home anchor are the same. The access terminal may, for example, do so by maintaining a context for each "type" of address, and issue IP communication requests accordingly (e.g. indicate whether a request is for the visited anchor or home anchor). Note that the access terminal already needs to support this scenario if it wants to allow for overlapping IP address spaces between the visited and home network anchor so such an extension is not necessarily burdensome.

In the case of a mobility event to a different network/region, a new visited anchor can be introduced. This can be done by using the general handover procedures already in place on the access terminal in support of dual-anchoring. Thus, applications that already work with dual-anchoring still work 'as is' with this new feature of dual-anchoring.

Note that there are a few activities that should occur on the anchor point in order to support the outlined optimization. First, when the access terminal registers with the network, it first registers with the visited anchor where the visited anchor address is assigned. Subsequently, it registers with the home network anchor where the home anchor address is assigned. Example embodiments of the present invention extend the network anchor to recognize that the visited and home anchor are the same and, as a result, the home anchor address returned is the visited anchor. Stated differently, the anchor operates as both a visited and a home anchor at the same time, and supports the operations of both (for example proxy mobile IP towards the access gateway, mobile IP towards the access terminal, home network policy support towards a policy manager, etc.).

Note that there are a couple of operational aspects to consider in such an arrangement. First, the home and visited anchors may be completely independent, or they may be interdependent. The anchors can be interdependent when the visited anchor contains a mobile IPv4 foreign agent (or similar) that is being used. In all other cases (including PMIPv6 and MIPv6) the anchors are independent. In regards to the interdependent anchor scenarios, the visited anchor takes part in the registration process for the home address (e.g. because the V-BM contains both a Home Agent for the visited anchor and a Foreign Agent for the home anchor). In such scenarios, the visited anchor establishes a context for the access terminal when the visited address is being assigned.

As the home address is being assigned, the home anchor sees that the visited address used as the care of address is an IP address from a pool, which is managed by this entity (e.g. a bearer manager that can operate as both a V-BM and H-BM) and, hence, the optimization can be applied. The home anchor, therefore, assigns the same IP address as the visited anchor (home anchor=visited anchor). Examining the IP addresses can be sufficient, even when there is overlapping IP address support present because there can be a NAT between the home anchor and each visited anchor with which there may be IP address overlap. The IP address to identify, therefore, could include both the CoA and the source IP address (in case of a mismatch, the source IP address should be used in the above procedure).

In regards to the independent anchor scenario, the visited anchor is not necessarily involved in the registration process for the home address. This will be the case when MIPv6 is being used, since MIPv6 does not provide a Foreign Agent. Similarly, in the MIPv4 case, when there is either not a Foreign Agent in the visited anchor or it is not being used, the access terminal registers directly with each anchor (the anchors are independent). This makes no difference to the home anchor though, since use of the optimization is generally triggered by examining the address (e.g., CoA). In the independent anchor case, the home anchor again sees that the CoA is from an IP address pool managed by this entity (e.g., bearer manager) and, hence, it assigns the same IP address as the visited anchor assigned. Note that the above solution does not necessarily require any Standards update and, furthermore, can be applied by optimizing an anchor entity alone.

The access terminal should be able to handle overlapping visited and home addresses. An alternative solution could be for the access terminal to recognize that it is in its home network/region and (based on that) only ask for one address to be assigned (the visited address since its assigned first and does not require another care of address). Note that typically the access terminal cannot recognize this based on IP address information alone since with dynamic home anchor assignment, the access terminal cannot tell if it is in its home network/region or not. Enhancements to the MIP signaling could, therefore, aid in these operations.

In certain scenarios, other enhancements to other types of signaling could possibly be needed. For example, if the visited address is assigned by proxy mobile IP procedures, then the access terminal does not participate in this signaling, but may, for example, perform just a DHCP exchange to obtain the IP address. This exchange would need to be enhanced to indicate to the access terminal that it is in its home network/region and, hence, does not need to get two addresses assigned (i.e. perform the MIP Registration Request to the home anchor).

Another variation of this strategy is to perform the MIP Registration Request, but for the home anchor to determine that it is also the visited anchor and indicate this to the access terminal. The access terminal is then assumed to deregister the just assigned home anchor address and use only the visited anchor address until a mobile event occurs. Common for some of these variations is that they may spawn processing in the access terminal to deal with the use of single or dual IP addresses. Should a mobility event to a different network/region occur, a separate home and visited anchor could be introduced, and special logic in the access terminal application would accommodate such a scenario.

Also, in certain circumstances, the old visited anchor needs to be used at the home anchor, and the old home/visited anchor needs to ensure that the MIP registration requests can assign the old visited address as the home address. From both a service provider and vendor point of view, it may be preferable to rely on the anchor to handle these optimizations and, hence, ensure they are not only being done, but also being done correctly.

Figure 3:
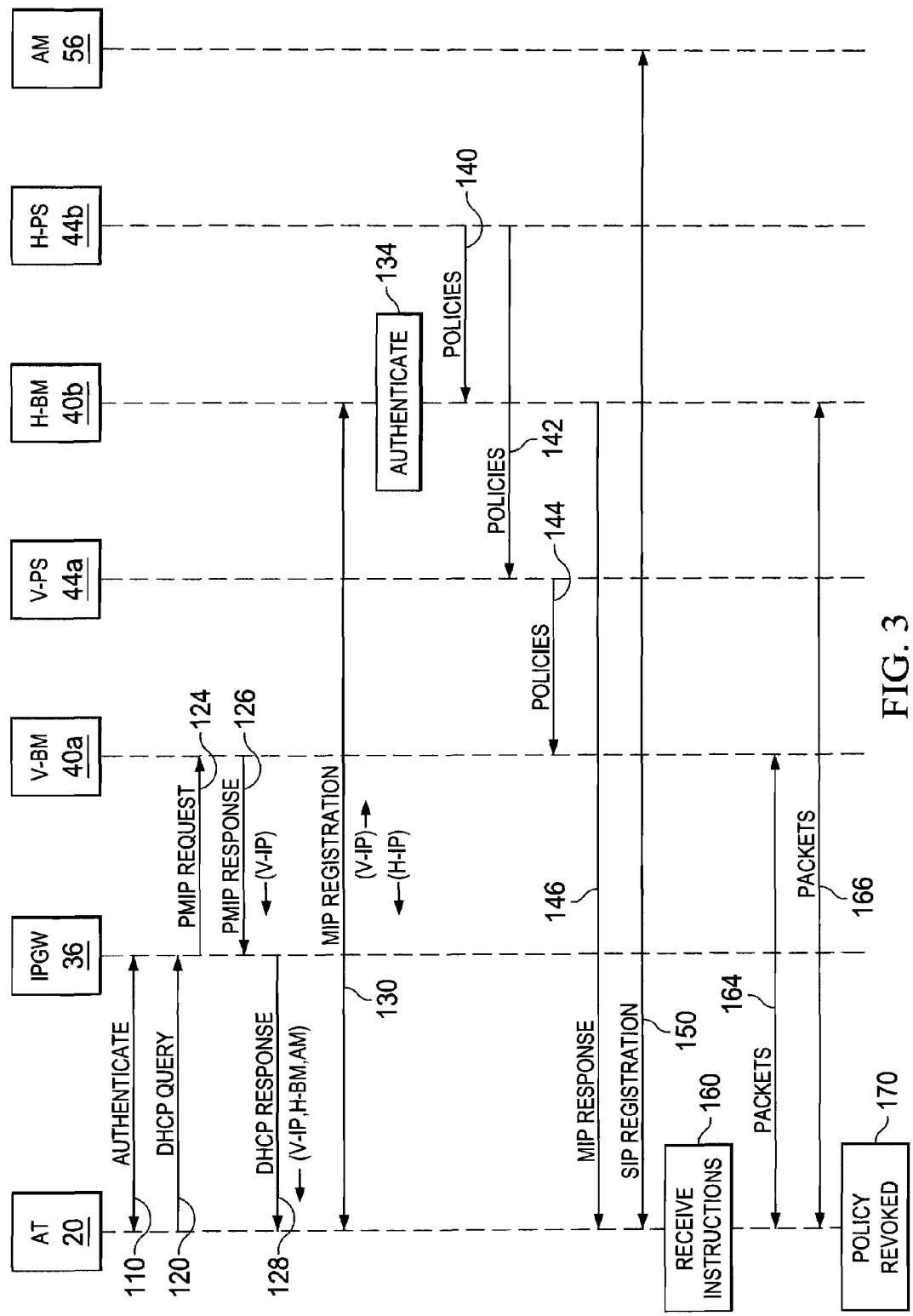
FIG. 3 illustrates one embodiment of a method for sending packets using either a home network address or a visited network address.

Turning now to FIG. 3, which outlines some of these operations, this flow illustrates one embodiment of a method for communicating packets using either a home network address or a visited network address. IP gateway 36 authenticates access terminal 20 at step 110. Access terminal 20 may be authenticated using any suitable protocol, for example, an extensible authentication protocol (EAP). Authentication may provide gateway 36 with addresses of home bearer manager 40b and applications manager 56 of access terminal 20.

Access terminal 20 obtains a visited network address at steps 120 through 128. The visited network address may be obtained using any suitable protocol, for example, DHCP and PMIP. Access terminal 20 sends a DHCP query to IP gateway 36 at step 120. IP gateway 36 obtains the visited network address from visited bearer manager 40a at steps 124 through 126. Gateway 36 sends a proxy mobile IP request to visited bearer manager 40a at step 124. Visited bearer manager 40a sends a visited network address to IP gateway 36 in a proxy mobile IP response at step 126. IP gateway 36 sends the visited network address to access terminal 20 in a DHCP response at step 128. The DHCP response may also include addresses for home bearer manager 40b and applications manager (AM) 56. Thus, there can be an IP (CoA) address assigned at step 128.

Access terminal 20 obtains a home network address at steps 130 through 150. Access terminal 20 registers with home bearer manager 40b at step 130 according to mobile IP registration. During registration, home bearer manager 40b can provide access terminal 20 with a home network address. Also, access terminal 20 notifies home bearer manager 40b of the visited network address as a point-of-attachment in order to include visited bearer manager 40a in home anchored path 80. Home bearer manager 40b authenticates the mobile IP registration at step 134. The authentication may be based on keys derived from the EAP authentication or from shared secret information provisioned for mobile IP authentication.

Home bearer manager 40b obtains policies from home policy server 44b at step 140. Home policy server 44b sends policies to visited policy server 44a at step 142. Visited bearer manager 40a obtains policies from visited policy server 44b at step 144. Home bearer manager 40b sends a mobile IP response to access terminal 20 at step 146.

Note that home bearer manager 40b can have intelligence that can recognize for this particular case, the user is not roaming and is located on the same bearer manager for both a home and visited network. Home bearer manager 40b will assign an IP address back to access terminal 20; however, the home IP address is the same as the visited IP address that was just received by access terminal 20. Thus, in one example implementation, the CoA address is the same as the home IP address being received by access terminal 20. This exchange occurs in the MIP response. In other scenarios that do not conserve IP addresses, access terminal 20 would simply be handed a second new IP address, but such a solution would consume essentially double the number of IP addresses.

Instead of that inefficient allocation, home bearer manager 40b can offer enhanced processing to identify scenarios in which access terminal 20 has already been issued an IP address through the visited bearer manager 40a. Note also that access terminal 20 should understand and process that the visitor and home bearer managers are sending it the same IP address.

Returning back to the flow of FIG. 3, access terminal 20 performs SIP registration with applications manager 56 at step 150. Access terminal 20 can receive instructions regarding the use of the visited and/or home network addresses at step 160. Access terminal 20 can communicate packets using bearer paths 82 and/or 80 according to the policy at steps 164 and 166. Packets may be communicated along bearer path 82 at step 164 using the visited network address, and/or packets may be communicated along bearer path 80 using home network addresses at step 166. Access terminal 20 communicates the packets according to the policy until the policy is revoked at step 170. After the policy is revoked, the method terminates. Modifications, additions, or omissions may be made to this flow without departing from the scope of the invention. The method may include more, fewer, or other steps. Additionally, steps may be performed in any suitable order.

Software and/or hardware (inclusive of memories and processors that can execute any software application) may reside in home bearer manager 40b, and/or access terminal 20 in order to achieve the teachings of the present invention. The software can offer the communication enhancements (outlined herein) and could be stored in any type of memory and subsequently executed by any type of processor to carry out the functionalities explained in this Specification. In one instance, only one the elements of these listed devices include software (in a consolidated fashion) in order to achieve the operational advantages as outlined here. In other embodiments, any of these components may be consolidated, or any one of these can be eliminated, or other components may be added to the system elsewhere, while remaining within the broad scope of the present invention. Due to their flexibility, home bearer manager 40b, and/or access terminal 20 may alternatively be equipped with (or include) any suitable algorithm, hardware, component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of these outlined configurations in the context of communication system 10 and, accordingly, they should be construed as such.

Figure 4:
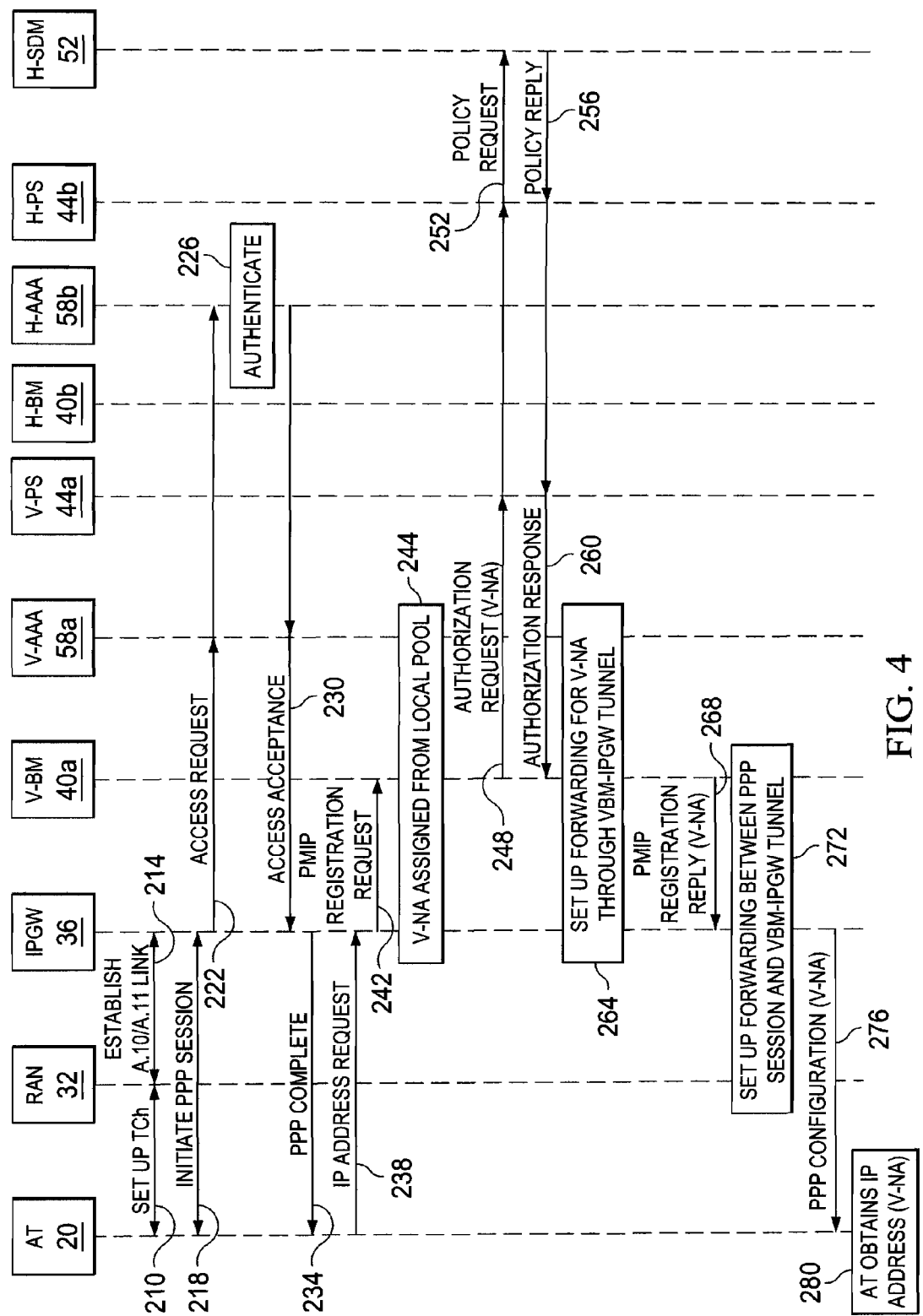
FIG. 4 illustrates one embodiment of a method for establishing a point-to-point session that may be used by the system of FIG. 1.

FIG. 4 illustrates one embodiment of a method for establishing a point-to-point session that may be used by communication system 10 of FIG. 1. The method begins at step 210, where a traffic channel (TCh) is set up to authenticate access terminal 20. The traffic channel may be set up as access terminal 20 powers up. Access terminal 20 may be provisioned with a network access identifier (NAI), a mobile node-authentication, authorization, and accounting (MN-AAA) security association, and a mobile node-home agent (MN-HA) security association. Radio access network 32 initiates establishment of A.10/A.11 link 92 with IP gateway 36 at step 214.

Access terminal 20 initiates a point-to-point (PPP) session with IP gateway 36 at step 218. In the link control protocol (LCP) phase of the PPP establishment, Password Authentication Protocol (PAP) and/or Challenge Handshake Authentication Protocol (CHAP) may be used to authenticate access terminal 20.

IP gateway 36 sends an access request to visited AAA server 58a at step 222, which relays the access request to home AAA server 58b. Home AAA server 58b authenticates access terminal 20 at step 226. Home AAA server 58b sends an access acceptance to visited AAA server 58a at step 230, which forwards the access acceptance to IP gateway 36.

The access acceptance may include authorization parameters inserted by home AAA server 58b and/or visited AAA server 58a. The parameters may describe resources assigned by servers 58. For example, home AAA server 58a may assign home bearer manager 44a for mobile IP service, and visited AAA server 58a may assign visited bearer manager 40a and visited policy server 44a. In one embodiment, the access request and access acceptance may use a Remote Authentication Dial In User Service (RADIUS) protocol.

IP gateway 36 informs access terminal 20 that the PPP session has been established at step 234. Access terminal 20 sends an IP address request to IP gateway 36 at step 238. The address request may be sent during the IP Control Protocol (IPCP) phase of the PPP establishment. IP gateway 36 sends a Proxy Mobile IP (PMIP) registration request to Visited bearer manager 40a at step 242. The registration request may indicate that the care of address is IP gateway 36 and that the agent is visited bearer manager 40a, and may be protected by an MN-HA security association. Visited bearer manager 40a authenticates the registration request and assigns a visited network address (V-NA) from a visited network address pool at step 244. visited bearer manager 40a sends an authorization request that can include the visited network address to visited policy server 44a at step 248. Visited policy server 44a forwards the authorization request to home policy server 44b.

Home policy server 44b sends a policy request to services data manager 52 at step 252. The policy request requests the policy corresponding to access terminal 20. Services data manager 52 sends the requested policy to home policy server 44b in a policy reply at step 256. Home policy server 44b sends an authorization response to visited policy server 44a at step 260. The authorization response can include the policy. Visited policy server 44a may add its own policy before forwarding the authorization response to home bearer manager 40b. In one embodiment, the authorization request and authorization response may use a Diameter protocol.

Visited bearer manager 40a sets up forwarding for visited network address through VBM-IPGW tunnel 88 at step 264. Visited bearer manager 40a may create a mobility binding entry for access terminal 20 to set up forwarding. Visited bearer manager 40a sends a PMIP registration reply to IP gateway 36 at step 268. The registration reply may include the visited network address as the home address, and may be protected by an MN-HA authentication extension.

IP gateway 36 sets up forwarding between the PPP session and the VBM-IPGW tunnel 88 at step 272. IP gateway 36 sends the visited network address to access terminal 20 in a PPP configuration message at step 276. Access terminal 20 obtains the visited network address at step 280. Access terminal 20 may use the visited network address to communicate packets along visited anchored path 82. Modifications, additions, or omissions may be made to the preceding flow without departing from the scope of the invention. The method may include more, fewer, or other steps. Additionally, steps may be performed in any suitable order.

Figure 5:
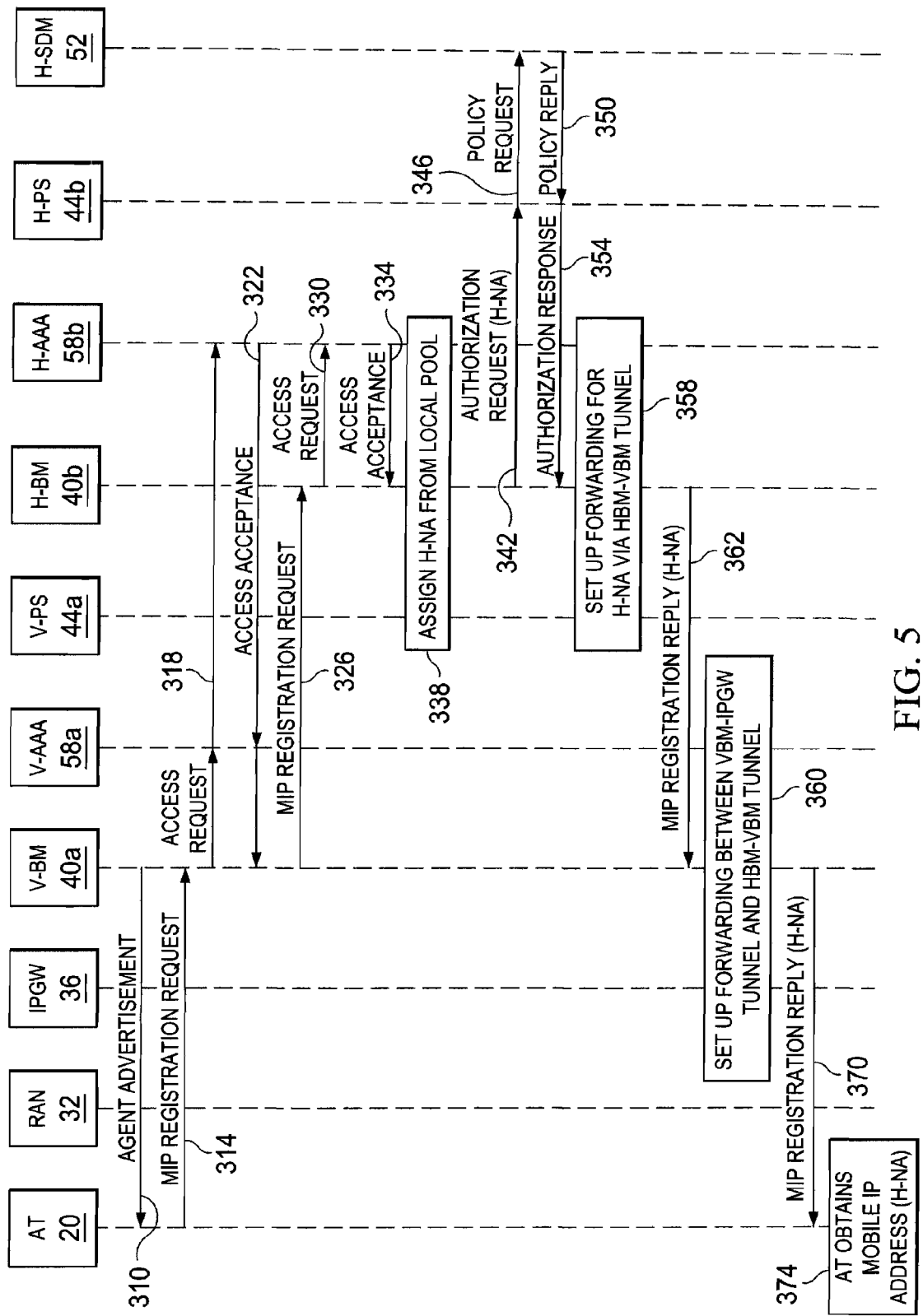
FIG. 5 illustrates one embodiment of a method for establishing a mobile Internet Protocol (IP) session that may be used by the system of FIG. 1.

FIG. 5 illustrates one embodiment of a method for establishing a mobile IP session that may be used by communication system 10 of FIG. 1. The method begins at step 310, where visited bearer manager 40a sends an agent advertisement to IP gateway 36, which forwards the agent advertisement to access terminal 20.

Access terminal 20 sends a mobile IP (MIP) registration request to visited bearer manager 40a at step 314. The message may include a mobile node-foreign agent (MN-FA) challenge extension, a mobile node-home agent (MN-HA) authentication extension, and a mobile node-AAA (MN-AAA) authentication extension.

Visited bearer manager 40a processes the registration request and maps the MN-FA challenge extension and MN-AAA authentication extension to an access request. Visited bearer manager 40a sends an access request to visited AAA server 58a at step 318, which forwards the access request to home AAA server 58b. Home AAA server 58b authenticates access terminal 20 and sends an access acceptance to visited AAA server 58a at step 322, which forwards the access acceptance to visited bearer manager 40a. The access acceptance may include authorization attributes from both the visited and home AAA servers 58.

Visited bearer manager 40a relays the registration request to home bearer manager 40b at step 326. In another embodiment, if access terminal 20 knows home bearer manager 40b, access terminal 20 may send the registration request directly to the home bearer manager 40b, which forwards the registration request to home AAA server 58b.

Home bearer manager 40b processes the registration request, and sends an access request to home AAA server 58b at step 330. Home AAA server 58b sends an access acceptance to home bearer manager 40b at step 334. The access acceptance may include authorization attributes for home agent service. Home bearer manager 40b assigns a home network address (H-NA) from a local address pool at step 338.

Home bearer manager 40b may authenticate the registration request according to the MN-HA security association, and then sends an authorization request to home policy server 44b at step 342. Home policy server 44b sends a policy request to services data manager 52 at step 346. The policy request requests the policy corresponding to access terminal 20. Services data manager 52 sends the requested policy in a policy reply at step 350. Home policy server 44b sends an authorization response with the policy to home bearer manager 40b at step 354. The authorization response can include the address for applications manager 56 assigned to access terminal 20 for SIP service.

Home bearer manager 40b sets up forwarding for home network address through HBM-VBM tunnel 86 at step 358. Home bearer manager 40b may create a mobility binding entry for access terminal 20 to create HBM-VBM tunnel 86. Home bearer manager 40b sends a registration reply to visited bearer manager 40a at step 362. The registration reply can include the assigned home network address. Visited bearer manager 40a sets up forwarding between VBM-IPGW tunnel 88 and HBM-VBM tunnel 86 at step 360. Visited bearer manager 40a relays the mobile IP registration reply to access terminal 20 at step 370.

The registration reply can include the home network address. Access terminal obtains the home network address as the mobile IP address at step 374. Access terminal 20 may use the home network address to communicate packets along home anchored path 80.

To re-register, access terminal 20 may send a re-registration request to visited bearer manager 40a, which forwards the request to home bearer manager 40b. The re-registration request may be a mobile IP registration request that can include the home network address and the visited network address. Home bearer manager 40b updates the mobility binding for access terminal 20. Home bearer manager 40b then sends a registration reply to visited bearer manager 40a, which updates the visitor entry for access terminal 20. Visited bearer manager 40b then sends the registration reply to access terminal 20, which updates its registration state.

To deregister, access terminal 20 sends a deregistration request to visited bearer manager 40a, which forwards the request to home bearer manager 40b. The deregistration request may comprise a registration request with a lifetime of zero. Home bearer manager 40b deletes the mobility binding for access terminal 20, and sends a registration reply to visited bearer manager 40b. Visited bearer manager 40b deletes the visitor entry for access terminal 20. Visited bearer manager

40b then sends a registration reply to access terminal 20, which deletes its registration state.

Note that the examples of the preceding FIGURES have been offered for purposes of teaching only. Accordingly, some of these discussed steps may be changed, deleted, or replaced with other steps where appropriate. Such modifications may be based on particular communication needs or specific communication architectures and configurations and are within the teachings of the present invention.

Although the present invention has been described in detail with reference to particular embodiments, it should be understood that various other changes, substitutions, and alterations may be made hereto without departing from the spirit and scope of the present invention. For example, although the present invention has been described as operating in IP Multimedia Subsystem (IMS) or Advanced IMS (A-IMS) technology environments or arrangements, the present invention may be used in any networking environment that could include such technology. Virtually any configuration that seeks to intelligently provision IP addresses could enjoy the benefits of the present invention. This could include the 3GPP System Architecture Evolution/Long Term Evolution (SAE/LTE) architecture and the 3GPP2 Network Evolution Architecture (Converged Access Network (CAN)). Furthermore, use of dual-anchoring is certainly applicable to WiMAX and the present invention encompasses such a technology in its broad teachings.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
    identifying that an Internet Protocol (IP) address managed by a home bearer manager has been previously sent to an access terminal, the IP address being issued by a visited bearer manager as a result of the access terminal requesting registration in a visited network, wherein the visited bearer manager anchors a visited anchored bearer path for communications with the access terminal using the visited anchored bearer path, and wherein the home bearer manager anchors a home anchored bearer path for communication with the access terminal using the home anchored bearer path, the home anchored bearer path passing through the visited bearer manager; and
    communicating the IP address to the access terminal in response to the access terminal registering in a home network, wherein the registrations in the home network and the visited network allow a plurality of packets to be communicated to the access terminal via the IP address.

2. The method of claim 1, wherein the IP address serves as a care of address (CoA) address and a home IP address concurrently.

3. The method of claim 1, wherein the IP address is exchanged via a mobile IP (MIP) exchange.

4. The method of claim 1, wherein a determination is made as to whether to use the home anchored bearer path or the visited anchored bearer path for communications.

5. The method of claim 4, wherein the determination further includes receiving a policy specifying use of the IP address.

6. The method of claim 4, wherein the determination further includes determining to use the IP address according to an instruction stored at the access terminal.

7. The method of claim 1, wherein the home and visited bearer managers are independent or interdependent.

8. The method of claim 1, wherein once the IP address is sent to the access terminal, the home bearer manager operates as both the visited bearer manager and the home bearer manager for the access terminal.

9. The method of claim 1, wherein the home bearer manager recognizes it is being used as a visited network anchor by evaluating a source IP address for a network address translation (NAT).

10. An apparatus, comprising:
    a home bearer manager that identifies that an Internet Protocol (IP) address managed by the home bearer manager has been previously sent to an access terminal, the IP address being issued by a visited bearer manager as a result of the access terminal requesting registration in a visited network, wherein the home bearer manager communicates the IP address to the access terminal in response to the access terminal registering in a home network, and wherein the registrations in the home network and the visited network allow a plurality of packets to be communicated to the access terminal via the IP address; and
    wherein the visited bearer manager anchors a visited anchored bearer path for communications with the access terminal using the visited anchored bearer path, and wherein the home bearer manager anchors a home anchored bearer path for communication with the access terminal using the home anchored bearer path, the home anchored bearer path passing through the visited bearer manager.

11. The apparatus of claim 10, wherein the IP address serves as a care of address (CoA) address and a home IP address concurrently.

12. The apparatus of claim 10, wherein the IP address is exchanged via a mobile IP (MIP) exchange, and wherein once the IP address is sent to the access terminal, the home bearer manager operates as both the visited bearer manager and the home bearer manager for the access terminal.

13. The apparatus of claim 10, wherein a determination is made as to whether to use the home anchored bearer path or the visited anchored bearer path for communications, and wherein the home bearer manager recognizes it is being used as a visited network anchor by evaluating a source IP address for a network address translation (NAT).

14. The apparatus of claim 13, wherein the determination further includes receiving a policy specifying use of the IP address.

15. The apparatus of claim 13, wherein the determination further includes determining to use the IP address according to an instruction stored at the access terminal.

16. Logic encoded in one or more non-transitory media for execution and when executed by a processor is operable to:
    identify that an Internet Protocol (IP) address managed by a home bearer manager has been previously sent to an access terminal, the IP address being issued by a visited bearer manager as a result of the access terminal requesting registration in a visited network, wherein the visited bearer manager anchors a visited anchored bearer path for communications with the access terminal using the visited anchored bearer path, and wherein the home bearer manager anchors a home anchored bearer path for communication with the access terminal using the home anchored bearer path, the home anchored bearer path passing through the visited bearer manager; and communicate the IP address to the access terminal in response to the access terminal registering in a home network, wherein the registrations in the home network and the visited network allow a plurality of packets to be communicated to the access terminal via the IP address.

17. The logic of claim 16, wherein the IP address serves as a care of address (CoA) address and a home IP address concurrently, and wherein the IP address is exchanged via a mobile IP (MIP) exchange.

18. The logic of claim 16, wherein a determination is made as to whether to use the home anchored bearer path or the visited anchored bearer path for communications.

19. The logic of claim 18, wherein the determination further includes receiving a policy specifying use of the IP address, and wherein the determination further includes determining to use the IP address according to an instruction stored at the access terminal.

20. The logic of claim 16, wherein once the IP address is sent to the access terminal, the home bearer manager operates as both the visited bearer manager and the home bearer manager for the access terminal.

21. A system, comprising:

means for identifying that an Internet Protocol (IP) address managed by a home bearer manager has been previously sent to an access terminal, the IP address being issued by a visited bearer manager as a result of the access terminal requesting registration in a visited network, wherein the visited bearer manager anchors a visited anchored bearer path for communications with the access terminal using the visited anchored bearer path, and wherein the home bearer manager anchors a home anchored bearer path for communication with the access terminal using the home anchored bearer path, the home anchored bearer path passing through the visited bearer manager; and means for communicating the IP address to the access terminal in response to the access terminal registering in a home network, wherein the registrations in the home network and the visited network allow a plurality of packets to be communicated to the access terminal via the IP address, wherein the IP address serves as a care of address (CoA) address and a home IP address concurrently.

* * * * *